Aug. 2, 1960    J. GREENHUT    2,947,833
REVERSING MOTOR SWITCH
Filed March 5, 1957

INVENTOR.
JOSEPH GREENHUT
BY
*Isler & Ornstein*
ATTORNEYS

United States Patent Office 2,947,833
Patented Aug. 2, 1960

2,947,833

REVERSING MOTOR SWITCH

Joseph Greenhut, 2564 Saybrook Road,
University Heights, Ohio

Filed Mar. 5, 1957, Ser. No. 643,990

7 Claims. (Cl. 200—80)

The present invention relates generally to starting switches for automatically reversing the direction of rotation of an electric motor at each energization thereof. More particularly the invention relates to a motor-reversing swtich especially adapted to establish an auxiliary power circuit in response to only one direction of rotation of the motor. The auxiliary circuit may be a light circuit or alarm circuit or the like, and is utilized in association with powered door operators, such as commonly used with overhead garage doors, or with other power devices where cyclic motor reversal is desirable or necessary.

It is a primary object of my invention to provide a simple, rugged reversing switch for electric motors.

Another object of my invention is to provide a reversing switch of the character described with means for establishing an auxiliary circuit in response to a selected direction of rotation of the motor.

Other objects and advantages of my invention will be apparent during the course of the following description.

In the accompanying drawings forming a part of this specification, and in which like numerals are employed to designate like parts throughout the same, Fig. 1 is a side elevation of a motor switch arrangement embodying the features of my invention.

Figure 1:
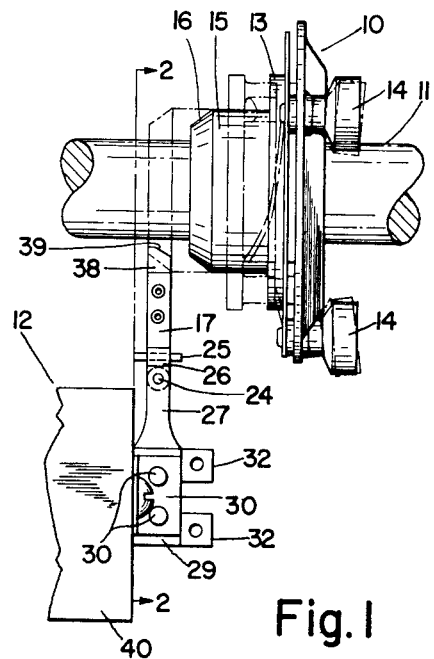

Referring more particularly to Fig. 1 of the drawings, I have shown a centrifugal speed responsive device 10 which is fixed to a motor shaft 11 for rotation therewith, as is well known in the art. The centrifugal device is commonly referred to as the "rotary" to distinguish it from the non-rotating or stationary switching element 12 with which it cooperates.

Such speed responsive devices are employed with split-phase induction motors to maintain the starting winding in the motor circuit until the motor attains an optimum predetermined speed. The embodiment which I have shown in Fig. 1 is a rotary of the character described in my U.S. Patent No. 2,616,682 to which reference may be had for a detailed disclosure of its structure and mode of operation. For the purposes of this specification it is sufficient to state that the rotary includes a spring-loaded non-conductive body element or shoe 13 which is axially movable on the motor shaft 11 in response to the centrifugally induced movement of peripheral weights 14 which are operatively mounted on the rotary.

The shoe 13 includes an annular extension or sleeve 15 having a conical end 16 which provides a cam surface or face on the shoe 13, for a purpose to be described.

Figure 2:
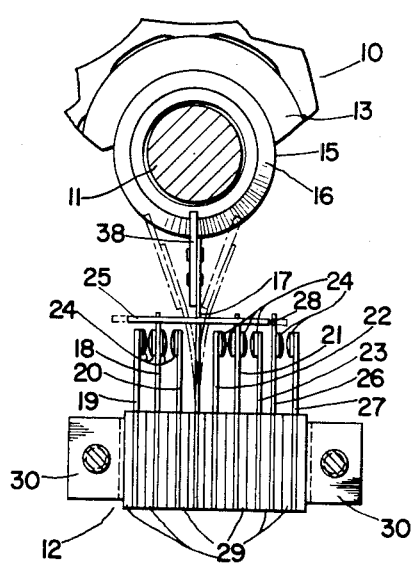
Fig. 2 is a fragmentary cross-sectional view taken on line 2—2 of Fig. 1.

As best seen in Fig. 2, the stationary switch 12 is essentially a three-pole, double-throw switch. It comprises a series of parallel aligned contact arms which are formed of thin, resilient conductor material, such as copper-beryllium spring metal or the like, and also includes a resilient actuating arm 17. A contact arm 18 is disposed intermediate contact arms 19 and 20. Another contact arm 21 is disposed intermediate contact arms 22 and 23. The contact arms 18 and 21 are each provided with double contacts 24, one contact being disposed on each side of the arm. The contact arms 19, 20, 22 and 23 are each provided with a single contact 24, these contacts being properly positioned for engagement with the contacts on arms 18 or 21, as the case may be.

The contact arms 18 and 21 provide two poles of the switch 12. The upper ends of the arms 18 and 21 are each secured to a connector or tie member 25 which is made of insulating material. The actuating arm 17 extends through the tie member 25 into the path of linear movement of the shoe 13.

Another pole of the switch 12 is provided by a contact arm 26 which has a single contact 24 adapted to engage a contact 24 provided on a contact arm 27. The arms 26 and 27 are also formed of conductor spring material such as copper-beryllium metal. The contact arm 26 projects into the path of movement of the end 28 of tie member 25, thus establishing a form of los-motion connection between the arm 26 and the tie member 25.

All of the arms are suitably spaced and insulated from each other by means of insulating blocks 29. Angle end plates 30 serve to provide a base for securing the switch to an element 40 of the motor frame, and the entire assembly is integrated by means of fasteners such as rivets 31 which extend through the assembly. Each of the contact arms is provided with a connection terminal 32 for convenience in wiring the switch into the motor circuit.

Figure 3:
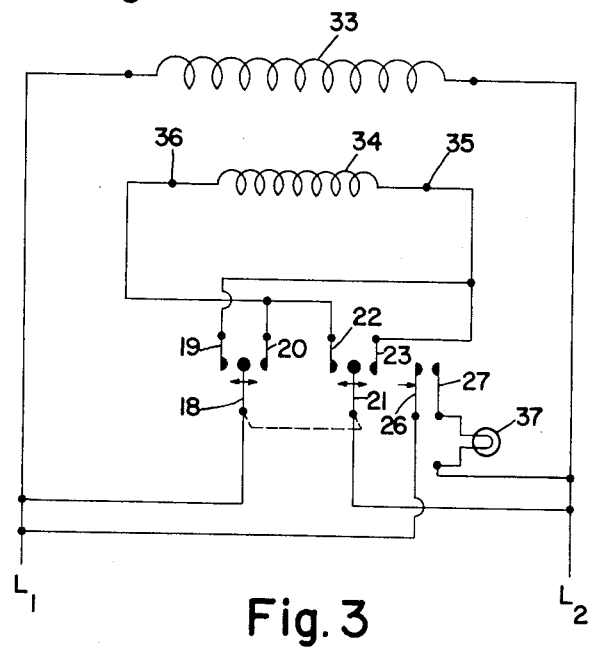
Fig. 3 is a circuit diagram of the switch arrangement shown in Figs. 1 and 2.

In Fig. 3 I have shown the relationship of the switch 12 to the motor circuit. The motor circuit includes a main or running winding 33 which is connected across the power lines $L_1$ and $L_2$ through conventional control mechanism (not shown). A starting winding 34 is connected in parallel with the main winding 33 through a starting circuit which includes the switch 12. The contact arm 18 is electrically connected to power line $L_1$ the contact arm 19 is electrically connected to one side 35 of the starting winding 34, and the contact arm 20 is electrically connected to the other side or terminal 36 of the winding 34. The contact arm 21 is electrically connected to power line $L_2$, the contact arm 22 is electrically connected to the terminal 36 of the winding 34, and the contact arm 23 is electrically connected to the terminal 35 of the winding 34.

An auxiliary lighting circuit is provided by a lamp 37 having one terminal thereof electrically connected to the power line $L_2$ and having the other terminal thereof connected to the contact arm 27. The lighting circuit is completed through contact arm 26 which is electrically connected to power line $L_1$, so as to operate independently of the motor circuit control mechanism.

In order to best describe the sequence of operation of my improved reversing switch, it will be assumed that the motor is being utilized in a power-operated mechanism for raising and lowering an overhead garage door. It will also be assumed that clockwise rotation of the motor shaft 11 (as viewed in Fig. 2) is effective to lower such garage door and that counter-clockwise rotation of the motor shaft causes raising or opening of the door.

When the motor shaft is rotating in a clockwise direction and the garage door is being lowered, the rotary device 10 will have retracted the shoe 13 to the solid line position shown in Fig. 1, so that the shoe does not engage the actuating arm 17 of the switch 12. The actuating arm 17 therefore maintains itself and the pole arms 18 and 21 in non-operative positions relative to the contact arms 19, 20, 22 and 23. Likewise pole arm 26 does not engage contact arm 27. Thus, there is no electrical contact between any of the contact elements of the switch 12, and neither the starting winding circuit nor the auxiliary lighting circuit is energized. The non-operative position of the switch 12 is shown in solid lines in Figs. 1 and 2 and is indicated in Fig. 3.

When the lowering of the door is completed, the motor circuit is opened by conventional control mechanism. The motor shaft then loses speed, thereby causing the weights 14 of the rotary device 10 to move inwardly as indicated in dotted lines in Fig. 1. This movement permits the shoe 13 to advance axially to the dotted line position shown in Fig. 1 and engage the end of actuating arm 17 while the shoe is still rotating in a clockwise direction. The free end of arm 17 may be suitably capped or provided with a replaceable extension 38 of any smooth, tough material such as may be selected from the various synthetic resins or reinforced plastic materials. The extension 38 may be provided with a rounded or inclined end 39 to facilitate its smooth engagement with the camming surface 16 of the extension 15.

The conical surface 16 of the shoe initially cams the free end of the resilient actuating arm 17 in a radially outwardly direction relatively to the axis of rotation of the shoe 13 and thereby causes the arm 17 to bend. Substantially simultaneously, the clockwise rotation of the shoes causes the end of the arm 17 to be directed to the left as shown in phantom outline in Fig. 2, and the arm is maintained in this deformed position until the motor is again energized.

The movement of the actuating arm 17 is transmitted through tie member 25 to the pole contact arms 18 and 21 which are correspondingly bent or deformed to a position wherein the arm 18 makes contact with the arm 19, and the arm 21 makes contact with the arm 22. Due to the lost-motion connection between the tie member 25 and pole arm 26, the position of the arm 26 is unaffected.

If the motor is again energized, the contact arms 18, 19 and 21, 22 establish a circuit through the starting winding 34 whereby the power line $L_1$ is electrically connected to terminal 35 and power line $L_2$ is electrically connected to terminal 36 of the starting winding. This circuit causes counter-clockwise rotation of the motor shaft 11 for raising the garage door. During the initial counter-clockwise rotation, the actuating arm 17 still is retained in the previously described posture. However, as soon as sufficient speed of rotation is attained, the rotary device 10 retracts the shoe 13 to permit the actuating arm to be restored to its unstressed position. The switch contacts are thereby opened and the circuit through the starting winding 34 is broken. The motor continues to operate until the door is fully raised, at which time the control mechanism opens the motor circuit. As the motor speed decreases, the shoe 13 is again advanced to deform the actuating arm 17. However, as a result of the counter-clockwise direction of rotation, the arm 17 is bent or stressed to the right, as shown in phantom outline in Fig. 2. This movement causes pole arm 18 to engage contact arm 20 and causes pole arm 21 to engage contact arm 23. Pole arm 26 is deformed in the direction of contact arm 27 to close the auxiliary circuit and energize lamp 37. The lamp therefore will stay lit as long as the garage door remains raised.

If the motor is now again energized, the contact arms 18, 20 and 21, 23 establish a circuit through the starting winding 34 whereby power line $L_1$ is electrically connected to winding terminal 36 and power line $L_2$ is electrically connected to winding terminal 35. This circuit causes a reversal of polarity or current flow in the winding 34 and therefore causes reversal of motor rotation from the counter-clockwise direction of the preceding cycle. The clockwise rotation causes lowering of the door and, when shoe 13 is retracted, the opening of both the starting winding circuit and the lamp circuit.

It will be noted that the degree to which the actuating arm is deformed or bent can be controlled by selecting or establishing the proper axial distance and radial distance of the end of arm 17 from the end of the shoe extension 15.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a switching device for an electric motor, the combination of a reversing switch operatively associated with the motor circuit, a body mounted on the motor shaft for rotation therewith and reciprocably movable thereon in response to predetermined motor speed changes, a switch-actuating element disposed in the path of movement of said body, means on said body for deflecting said element out of the path of movement of said body when said rotating body advances into engagement with said element, and means responsive to the direction of deflection of said element for closing said switch to provide a circuit for counter-rotation of said motor.

2. A combination as defined in claim 1, wherein said switch-actuating element is fixed against movement in the plane of reciprocable movement of said body.

3. A combination as defined in claim 1, wherein said switch-actuating element is flexible in a plane of movement normal to the plane of reciprocable movement of said body.

4. A combination as defined in claim 3, wherein said advanced body traverses the plane of movement of said switch-actuating element to retain said element in deflected position during counter-rotation of said advanced body.

5. A combination as defined in claim 3, wherein said switch includes a first set of contacts for the motor circuit engageable in response to the deflection of said switch-actuating element in one direction, a second set of contacts for the motor circuit engageable in response to deflection of said switch-actuating element in the other direction, and a third set of contacts for an auxiliary power circuit engageable in response to deflection of said switch-actuating element in said one direction, whereby said auxiliary power circuit is selectively established in response to one direction of rotation of said body.

6. In a switching device for an electric motor, the combination of a multiple-contact reversing switch operatively associated with the motor circuit, a flexible switch-actuating element mounted on said switch and movable in one direction to close one motor circuit and movable in the opposite direction to close a reversing motor circuit, a body mounted on the motor shaft for rotation therewith and reciprocably movable thereon in response to predetermined motor speed changes, and means provided on said body for deflecting said switch-actuating element in the direction of rotation of said body in response to reciprocable movement of said body into the plane of movement of said element, whereby to establish one of said motor circuits for counter rotation of said body.

7. In a switching device for an electric motor circuit, the combination of a plurality of pairs of contact arms secured in spaced parallel relationship, a movable pole element disposed between the contact arms of each of said pairs in parallel spaced relationship thereto, means connecting said pole elements for unitary movement, and means responsive to the direction of rotation of said motor for moving said pole elements into circuit-closing relationship with one or the other contact arm of each of said pairs of contact arms.

References Cited in the file of this patent

UNITED STATES PATENTS

| | | |
|---|---|---|
| 2,234,309 | Kromholz | Mar. 11, 1941 |
| 2,318,761 | Curtis | May 11, 1943 |
| 2,385,858 | Horman | Oct. 2, 1945 |
| 2,465,332 | Witte | Mar. 22, 1949 |
| 2,683,844 | Schaefer | July 13, 1954 |
| 2,701,855 | Hammes | Feb. 8, 1955 |